(12) United States Patent
diPilla

(10) Patent No.: US 9,672,263 B1
(45) Date of Patent: Jun. 6, 2017

(54) RELIABILITY ENGINEERING DATA INTEGRATION

(71) Applicant: Michael A. diPilla, Philadelphia, PA (US)

(72) Inventor: Michael A. diPilla, Philadelphia, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 188 days.

(21) Appl. No.: 14/312,273

(22) Filed: Jun. 23, 2014

(51) Int. Cl.
*G06F 7/00* (2006.01)
*G06F 17/30* (2006.01)

(52) U.S. Cl.
CPC ............... *G06F 17/30575* (2013.01)

(58) Field of Classification Search
CPC ......... G06F 17/30283; G06F 17/30286; G06F 17/30557; G06F 17/30587; G06F 17/30575
USPC .................. 707/610, 611, 755, 711; 709/248
See application file for complete search history.

(56) References Cited

U.S. PATENT DOCUMENTS

| | | | | |
|---|---|---|---|---|
| 6,820,046 B1 * | 11/2004 | Lamson | ............... | G06F 17/5036 257/209 |
| 6,961,723 B2 * | 11/2005 | Faybishenko | ..... | G06F 17/30867 |
| 7,117,223 B2 * | 10/2006 | Koizumi | ............. | G06F 17/2836 |
| 7,231,356 B1 * | 6/2007 | Ward | ..................... | G06Q 10/00 703/6 |
| 7,248,978 B2 * | 7/2007 | Ransom | .................. | G01D 4/004 702/182 |
| 7,270,491 B2 * | 9/2007 | Oda | ........................... | B41J 3/01 101/288 |
| 7,574,030 B2 * | 8/2009 | Fors | .................... | H04N 1/00132 358/487 |
| 7,596,571 B2 * | 9/2009 | Sifry | .................... | G06F 17/3089 |

(Continued)

OTHER PUBLICATIONS

Michael diPilla, Kathy Miraglia, and John Gierchak, "LCS and the Reliability Engineering Data Integration (REDI) System," Intelligent Ships IX Symposium, Drexel University, Philadelphia, Pennsylvania, May 25-26, 2011 (6 pages).

(Continued)

*Primary Examiner* — Daniel Kuddus
(74) *Attorney, Agent, or Firm* — Howard Kaiser

(57) ABSTRACT

Exemplary practice of the present invention provides an electronic system for integrating information from various network sources. The inventive system includes a server computer and at least one client computer (e.g., tablet). According to the software logic resident in the server computer, information is transmitted from various online resources (e.g., web-accessible collections of data) to an enterprise service bus (ESB), and the ESB collates some or all of the information received and stores the collated information in a network database. According to the software logic resident in each client computer, the collated information stored in the network database is downloaded onto an online webpage, parsed, stored in a local database, synched, and downloaded onto an offline webpage. A client can direct the server to collate a particular segment of information, thus affording the client offline access to pertinent, well-organized information on a portable, wireless platform such as a tablet.

18 Claims, 6 Drawing Sheets

(56) References Cited

U.S. PATENT DOCUMENTS

| | | | |
|---|---|---|---|
| 7,788,425 B2* | 8/2010 | Ikemoto | G06F 21/57 710/113 |
| 8,086,701 B2* | 12/2011 | Goel | H04L 41/0803 709/220 |
| 8,229,776 B1 | 7/2012 | Woodward et al. | |
| 8,396,958 B1 | 3/2013 | Hilferty | |
| 8,532,970 B2* | 9/2013 | White | G09B 19/0053 703/13 |
| 8,589,133 B1 | 11/2013 | Dalessandro et al. | |
| 8,832,061 B2* | 9/2014 | Kothule | G06F 17/30581 707/707 |
| 9,152,787 B2 | 10/2015 | Gathala et al. | |
| 9,189,624 B2 | 11/2015 | Gathala et al. | |
| 9,298,494 B2* | 3/2016 | Gathala | G06N 5/043 |
| 9,324,034 B2 | 4/2016 | Gupta et al. | |
| 9,495,537 B2 | 11/2016 | Gupta et al. | |
| 9,591,022 B2 | 3/2017 | Purpura | |
| 2002/0083145 A1 | 6/2002 | Perinpanathan | H04L 29/06 709/213 |
| 2007/0294370 A1* | 12/2007 | Fay | G06Q 10/109 709/219 |
| 2009/0083650 A1* | 3/2009 | Kennedy | G06F 17/30557 715/771 |
| 2009/0271360 A1* | 10/2009 | Bestgen | G06F 17/30463 |
| 2014/0297427 A1* | 10/2014 | Qian | G06Q 30/0276 705/14.71 |
| 2014/0379654 A1* | 12/2014 | Kothule | G06F 17/30581 707/634 |
| 2015/0026604 A1* | 1/2015 | Mulukuri | G06Q 50/01 715/758 |
| 2015/0046393 A1* | 2/2015 | Kamal | G06Q 10/103 707/617 |

OTHER PUBLICATIONS

Matthew Conti, Charles Slavik, and Brad Ross, "Enhanced Multi-Dimensional Condition Based Monitoring," ASNE EMTS (Electric Machines Technology Symposium) 2012, Philadelphia, PA, May 23-24, 2012 (17 pages).

"Condition Based Maintenance: OstiaEdge Smarthship CBM Technology," ESRG (Engineering Software Reliability Group), http://www.esrgtech.com/marine/condition-based-maintenance, Copyright 2014 (2 pages; accessed online on Jun. 4, 2014).

"SERMC (Southeast Regional Maintenance Center) Uses Tablet PCs for Maintenance," CNRMC (Commander Navy Regional Maintenance), NAVSEA (Naval Sea Systems Command), http://www.navsea.navy.mil/CNRMC/Lists/News/Article.aspx?ID=7, Oct. 25, 2011 (1 page; accessed online on Jul. 10, 2014).

\* cited by examiner

| LOCAL WEBPAGE | PURPOSE/FUNCTION |
|---|---|
| 2-Kilo | Launches the REDI configuration search page, enabling user access to Navy Combat Oriented Maintenance Organization (COMO) data to allow user to select equipment component and document discrepancy using standard statements developed by the Navy. |
| CSMP | Launches the REDI CSMP page, displaying the most recent CSMP history for configured hull. Additionally, the CSMP is presented to the user prior to the issuance of new work orders to avoid duplication. |
| Parts | Launches the REDI parts page, enabling the user to search for configuration items by parts prior to writing 2-Kilo. The user can search by part number or National Item Identification Number (NIIN). |
| Tech Manuals | Launches the REDI tech manual search page, enabling the user to search for tech manuals by name and ID for configured hull, working in conjunction with the Technical Data Knowledge Management (TDKM) system for updates. |
| EOSS/CSOS | Provides access to ship's OSS documentation. |
| PMS | Provides access to Navy PMS procedures. |

FIG. 6

RELIABILITY ENGINEERING DATA INTEGRATION

BACKGROUND OF THE INVENTION

The present invention relates to reliability engineering, more particularly to computer-related and network-related methods and systems for integrating data pertaining to reliability engineering.

Reliability engineering is engineering that focuses upon reliability (dependability) in the lifecycle management of mechanical systems and components. Reliability concerns the ability of a system or component to function properly under given conditions for a quantified period of time. Many commercial and military entities seek to balance maintenance needs versus practical constraints with regard to their machinery and equipment.

The United States Navy endeavors to modernize and sustain an aging fleet and to achieve target numbers of ships. As the Navy transitions, many facets of operations and maintenance are impacted. Mission requirements are expanding, while resources (e.g., manpower, money, and time) are diminishing. The accessing of necessary maintenance data is time-consuming, and data is not readily available in a particular shipboard system for a user to access.

The Navy uses diverse legacy maintenance systems and databases that support execution of shipboard work. The Navy's maintenance systems and databases include, inter alia, the following: Maintenance Engineering Library Server (MELS); Integrated Condition Assessment System (ICAS); Organizational Maintenance Management System—Next Generation (OMMS-NG); Planned Maintenance System, planned/preventative maintenance scheduling software (PMS, SKED); Regional Maintenance Automated Information System (RMAIS); Maintenance and Material Management System (3M); Ship Configuration and Logistic Information System (SCLSIS); Integrated Class Maintenance Plan (ICMP); Configuration Data Managers Database-OA (CDMD-OA); Maximo® (IBM's asset management software); maintenance replacement rate (MRR) data; condition-based maintenance (CBM) data.

The many maintenance informational groupings (e.g., maintenance systems and maintenance databases) of the Navy are "separate" in the sense that they may use or share data from or with each other, but they are not linked or coupled directly with each other. The Navy's conventional approach to all-encompassing maintenance documentation requires manual data searches and entries that are numerous, inefficient, unwieldy, and repetitive due to the multiplicity of legacy maintenance systems that are required to be used in execution of such maintenance documentation. Current Navy integration of various maintenance systems involves paper printouts filled out by hand (e.g., paper printed spiral bound books), and manual data transfer among the systems. These conventional methods for comprehensive maintenance documentation are exceptionally labor-intensive, particularly as they require ship's force to investigate machinery field correlation before creating a work candidate.

SUMMARY OF THE INVENTION

The present inventor has dubbed his invention "Reliability Engineering Data Integration," with the acronym "REDI." Exemplary practice of the present invention avails itself of existing maintenance informational groupings (e.g., maintenance systems/databases). Exemplary inventive embodiments provide easy accessibility of required equipment information by coupling existing and evolving information systems together in a useful and effective web interface, thereby accomplishing sustainment of condition-based maintenance (CBM). It must be emphasized, however, that the present invention can be practiced in many contexts and for many purposes, as inventive principles of data transfer from web-based sources to a portable platform are useful for multifarious applications.

In the maintenance realm, inventive practice can serve, for instance, to streamline CBM and logistics assessments for the U.S. Navy. Through its unique implementation of a tablet platform (portable tablet computers) and other computer and networking technologies, inventive practice succeeds in modernizing maintenance, reducing maintenance time, and mobilizing capabilities for the Navy Fleet. Ship personnel using tablets are afforded simplified and straightforward views of navy maintenance and logistics information. REDI provides for multiple real-time users with a single login for each user. Moreover, REDI involves no client-side installs, since the tablet is web-browser-based.

A typical conventional process for performing consolidated maintenance evaluation involves people logging into various systems manually, and takes several man-hours per job; accordingly, considerable time is spent confirming configuration information, clarifying deficiency write-ups, and copying and pasting former maintenance requirement forms into newer formats. All of these tasks are automated by the present invention's REDI. Exemplary inventive practice allows for robustness, extensibility, security, speed, ease of use, and accessibility of requisite hardware.

Website capabilities for a desktop PC onboard a ship have previously been developed by the Navy. Exemplary inventive practice implements mobile technology for shipboard use. Providing capabilities on a tablet PC, the present invention affords ease of use and intuitive operation. Exemplary inventive embodiments implement software developed in HTML5, and thus can be ported to any platform. Through the present invention's unique methodology, data can be seamlessly transferred from server to tablet for mobile use onboard ship.

An exemplary REDI system provides a computer tablet user onboard a ship a view of, among other things: updated CBM data; current ship's maintenance plan (CSMP); scheduled preventive maintenance (PMS); PMS procedures; tech manuals; related EOSS documents. In addition, ship personnel can redline the various ILS documents and create the appropriate Navy feedback forms.

Exemplary practice of the present invention integrates information from different sources. Data is input from plural informational groupings into an enterprise service bus. At least a portion of the data that is input into the enterprise service bus is collated. The collated data is stored in a network database. The collated data that is stored in the network database is downloaded onto an online webpage. The collated data that is downloaded onto the online webpage is parsed. The parsed collated data is stored in a local database. The parsed collated data that is stored in the local database is synched. The synched parsed collated data that is stored in the local database is downloaded onto an offline webpage. According to frequent inventive practice, the client computer (e.g., tablet) user selects a subject, the data that is input into the enterprise service bus pertains to the selected subject, and the selected subject is communicated to the enterprise service bus prior to the storing in a network database.

The term "informational grouping" is broadly defined herein to encompass any set, body, or collection of data or information. An informational grouping is characterized by organization, and typically contains related data or information that is organized for access or retrieval by a computer, such as via web, internet, intranet, or network. Informational groupings include but are not limited to entities variously referred to as "databases," "systems," "records," "indexing tools," "search engines," etc. An informational grouping may include the actual data/information and the supporting data structures. Accordingly, a maintenance-related body/collection of data/information of any name or description (e.g., database, system, record, indexing tool, search engine) is designated herein a "maintenance informational grouping."

Incorporated herein by reference is the following six-page paper co-authored by the present inventor: Michael diPilla, Kathy Miraglia, and John Gierchak, "LCS and the Reliability Engineering Data Integration (REDI) System," Intelligent Ships IX Symposium, Drexel University, Philadelphia, Pa., 25-26 May 2011.

BRIEF DESCRIPTION OF THE DRAWINGS

The present invention will now be described, by way of example, with reference to the accompanying drawings, wherein:

FIG. 2 shows the communication between the server side and the client side, and the transformation of server-side data to client-side data viewable on a local webpage of a handheld tablet.

FIG. 6 is a table describing the six maintenance-related offline webpages shown in FIG. 5 in accordance with the present invention.

Figure 1:
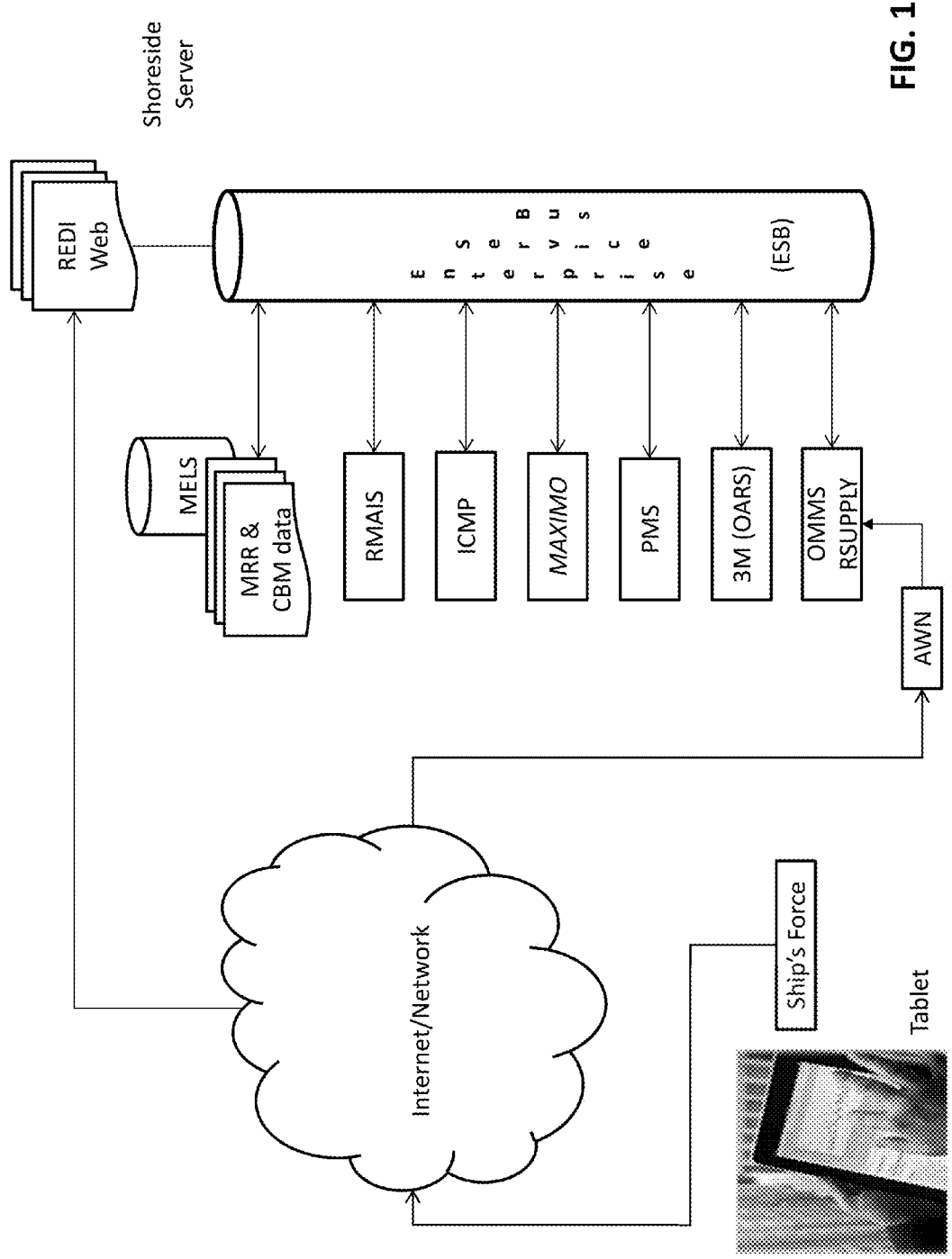
FIG. 1 is a schematic illustrating an example of a ship-to-shore/shore-to-ship high-level architecture characterizing integration of maintenance information in accordance with the present invention. An Enterprise Service Bus (ESB) receives maintenance-related data input from various maintenance informational groupings. Through implementation of the ESB, tablet computers, server-side programming, and client-side programming, ship personnel can travel throughout the ship while wirelessly accessing intelligible presentations of relevant data.

DESCRIPTION OF EXEMPLARY
EMBODIMENTS OF THE INVENTION

Referring to the figures, in exemplary practice the present invention's REDI represents an open interface modem architecture that automates interactions among the diverse Navy logistics legacy systems. REDI thus facilitates the maintenance process for the assessor, the planner, and the maintainer. A first important feature of an exemplary REDI system is its implementation of a modem technology architecture known as the enterprise service bus (ESB). A second important feature of an exemplary REDI system is its implementation of a portable tablet so that the tablet interfaces to a central server.

Frequent inventive practice implements an electronic device commonly known as a "tablet" or "tablet PC." Other kinds of platforms can also be implemented in inventive practice. A conventional tablet is a portable, wireless personal computer (PC) that includes a computer component and a display component; that is, a tablet includes a processor, memory/storage (both volatile and non-volatile), and a touchscreen display. Depending on the inventive embodiment, inventive software resident in the memory of the tablet may be coded in practically any computer programming language. The present invention can be embodied, for instance, as a method (e.g., a computer-implemented method), a system or an apparatus including a computer, or a computer program product.

Many embodiments of the present invention implement an ESB having computer code that is executable by the ESB and is characterized by computer program "business" logic. The business logic is designed to ensure consistency, coherency, efficiency, and accuracy of information obtained by a tablet user. An exemplary ESB according to the present invention's REDI is a coupled-standards-based Enterprise Service Bus (ESB). The ESB integrates, in near real-time, Navy maintenance systems and databases through open interfaces. REDI integrates all applicable maintenance data/information for particular equipment to be analyzed, thereby facilitating planning and scheduling and affording holistic perspectives of information germane to maintenance.

According to exemplary business logic of inventive practice, an enterprise service bus (ESB) provides a single-source user interface. The ESB manages the transfer of data. The pertinent data is combined in one central site and is logically connected via business rules that enable the user to more effectively manage the health and reliability of the subject equipment. Details of the ESB tool can be customized to allow for different utilizations, depending on user preferences.

REDI remotely monitors the machinery, leveraging various utilities to produce recommended action reports and machinery status reports. These reports provide recommendations based on machinery operational information. The present invention's ESB design reduces complexities of integrating disparate applications by leveraging service-oriented architecture principles and standardized packaging frameworks. Based on business logic in REDI's ESB, only necessary data is presented by REDI to users. The users are thus permitted to concentrate on key decisions, instead of mundane tasks (such as login, manually aggregating key data into Excel or other offline tools, etc.).

Figure 5:
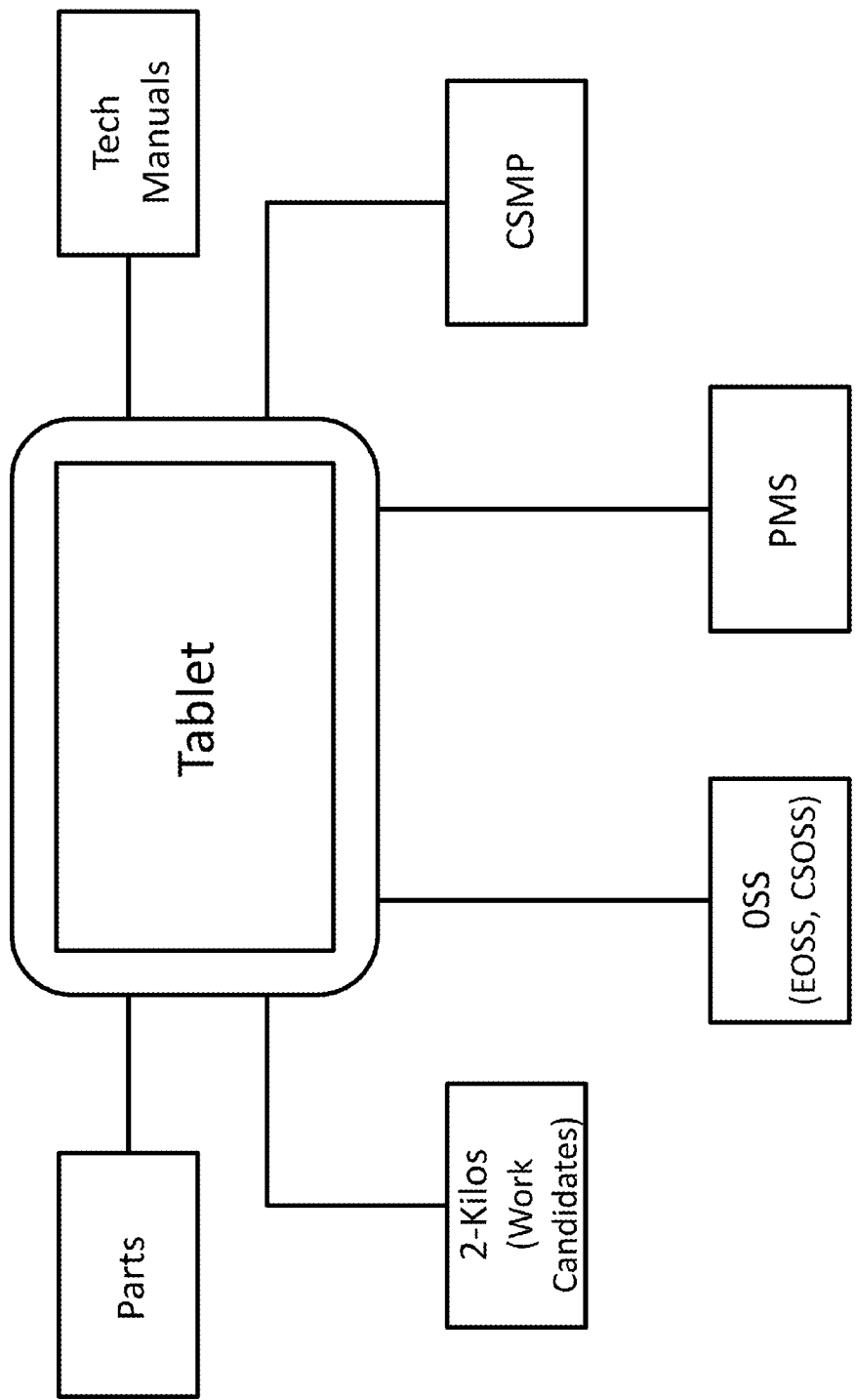

FIGS. 1 through 6 exemplify inventive practice in Navy shipboard maintenance applications. A portable tablet can display a variety of webpages, including but not limited to any of the webpages shown in FIGS. 4 and 5. For instance, as shown in FIGS. 5 and 6, these webpages can include: a Parts webpage; a Tech Manuals webpage; a 2-Kilo webpage; a Current Ship's Maintenance Project (CSMP) webpage; an Operational Sequencing System (OSS) webpage, e.g., an Engineering Operational Sequencing System (EOSS) and/or a Combat Systems Operational Sequencing System (CSOSS) webpage; a Planned Maintenance System (PMS) webpage.

Figure 2:
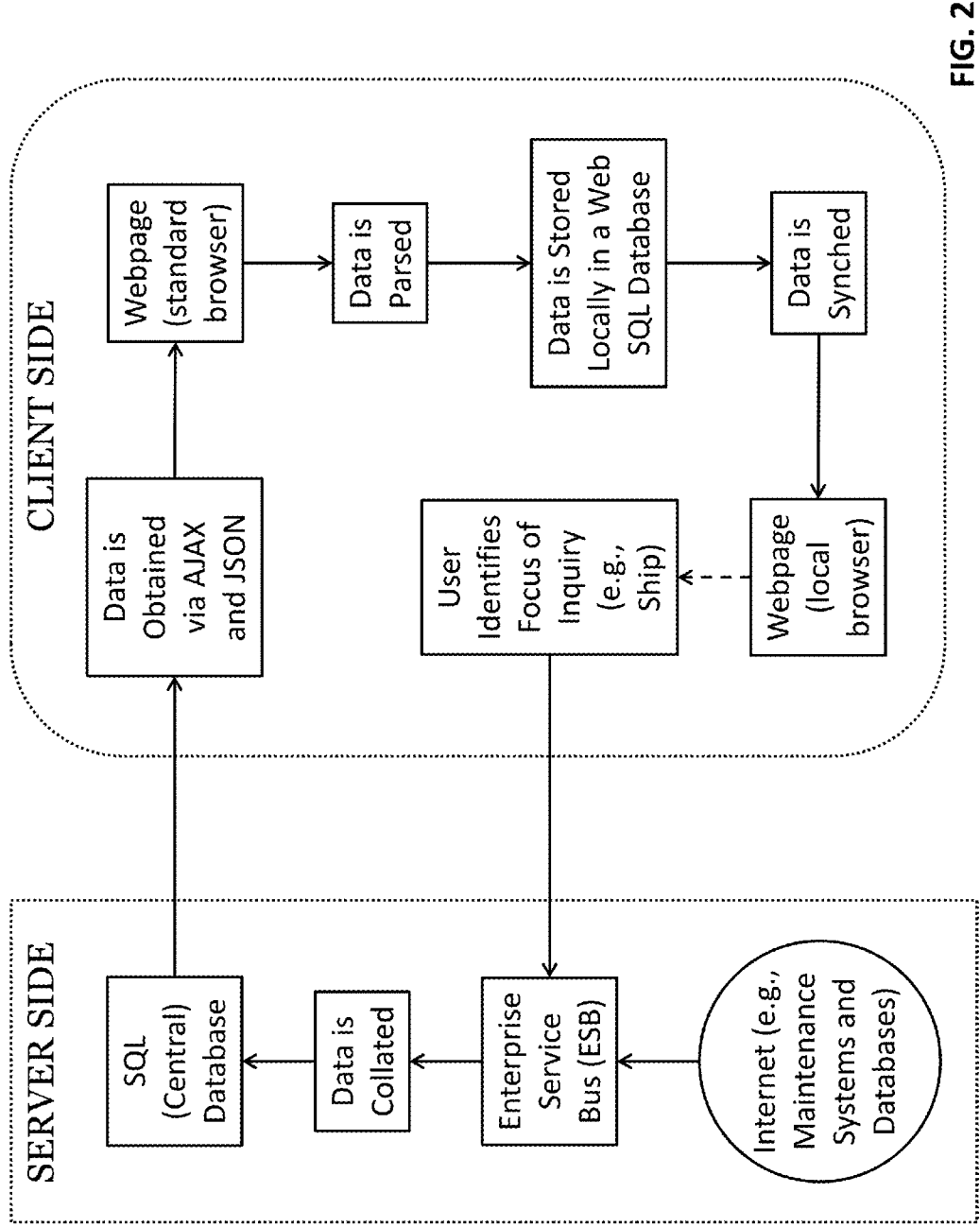
FIG. 2 is a schematic illustrating server-side programming and client-side programming that are included in an exemplary embodiment of integration of maintenance information in accordance with the present invention.
Figure 3:
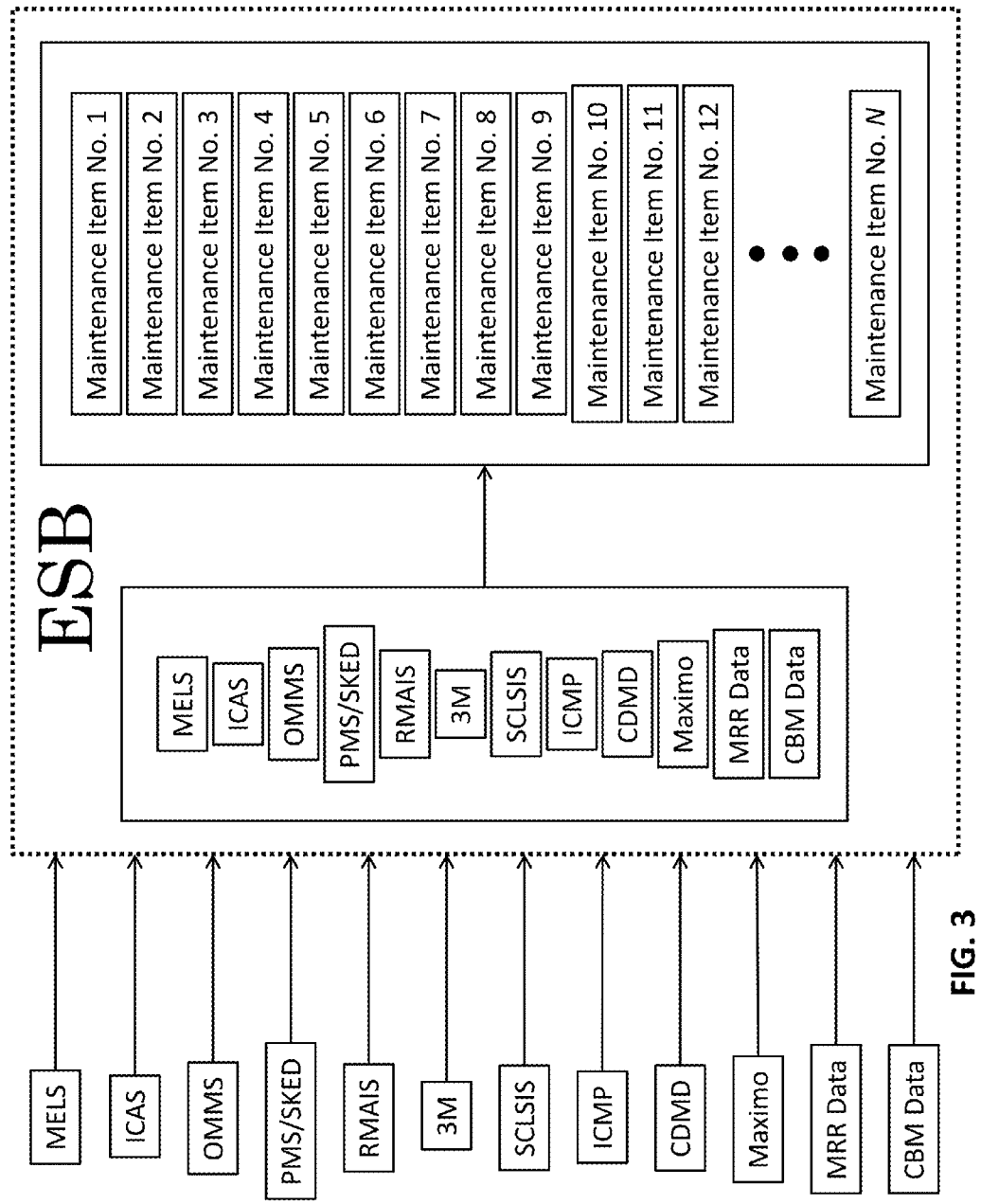
FIG. 3 is a schematic illustrating input of maintenance information into an enterprise service bus (ESB), and processing thereby. The ESB receives maintenance data from diverse informational groupings, and collates the information so as to order and index numerous maintenance items.
Figure 4:
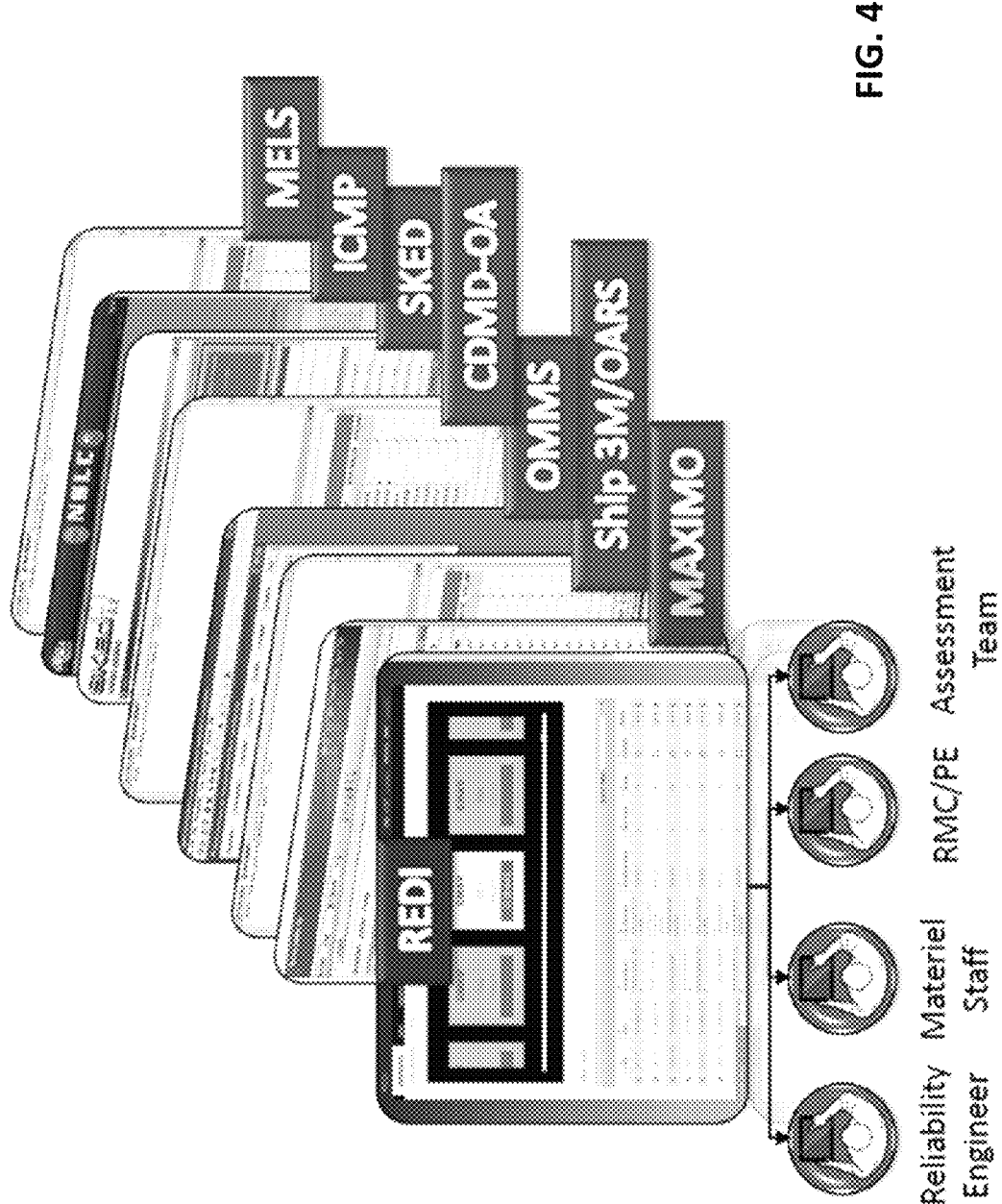
FIG. 4 and FIG. 5 are schematics illustrating different examples, in accordance with the present invention, of various maintenance-related offline webpages that may be displayed on a portable tablet used by a person onboard a ship. Orderly assimilations of information deriving from various maintenance informational groupings are displayed wirelessly and offline on portable tablets used by various shipboard personnel.

Particularly with reference to FIGS. 2 and 3, an exemplary REDI system has various software components, such as .Net, Oracle, Microsoft, JavaScript, jQuery, JSON, AJAX, WEBSQL, and HTML5. REDI aggregates and accesses all of the related information for the user. Further, REDI transfers the related information to a tablet to be used in a mobile environment. REDI thus transforms information available on a server to information having a usable format on the tablet.

REDI gathers data (information) from the Internet (e.g., from different data sources and servers on the shore), and compounds the data into a central SQL Server database using various web services, SQL net, and/or apis that have been made available by maintenance system/database owners. The user communicates with the ESB to request a particular subject, for instance a particular ship. The ESB can filter the data for any ship that the user chooses. Data sources/servers currently availed of by the Navy include 3M, MELS, SCLSIS, OMMS, CDMD, RMAIS, PMS, and SKED.

As shown in FIG. 3, the data filtering performed by the ESB includes data collation. The ESB collates the data received from the internet maintenance informational groupings (e.g., websites, systems, databases, records, search/indexing tools). That is, the ESB orders and indexes the collective information as various maintenance items. Consequently, the client computer (e.g., tablet) user has, for presentation at his/her disposal, a coherent synthesis of information that is internally linked at the maintenance-item level. As a hypothetical example, the tablet user can access all information pertaining to "widget number 99," wherein such information has been gathered from the collective maintenance informational groupings.

In computer technology, the terms "collate" and "collation" are commonly understood to refer to merging of sequenced data from plural datasets or files to produce a new sequenced dataset or file. The term "maintenance item" is broadly defined herein to refer to a part, a component, a machine, a piece of equipment, or any other entity that can be a subject of maintenance-related activity in a technical (e.g., machinery or industrial) environment.

Accordingly, the user of a tablet or other computer platform (mobile phone, laptop, desktop, etc.) can select a maintenance item of interest and view all information relevant thereto, as collated by the ESB. For instance, a person onboard ship can use his tablet touchpad to view all information that the ESB has consolidated that pertains to a particular machine part. The present invention's REDI system thus takes data from disparate sources and integrates the data in such a fashion as to be usefully and intelligibly presented on a platform such as a tablet.

The data filtered by the ESB is formatted by means of a webpage, one or more web applications for asynchronous data transfer (such as AJAX and JSON), and data parsing. Generally speaking, as the terms "asynchronous" and "synchronous" are used in computer programming, an asynchronous process operates in a manner independent of all other processes, whereas a synchronous process operates in a manner dependent upon one or more other processes. Exemplary inventive practice implements JSON (JavaScript Object Notation) and AJAX (Asynchronous JavaScript and XML). JSON is a file format; AJAX is a tool to get data out of the JSON file.

"AJAX" is a term that refers to any of various web applications used on the client side to send data to and retrieve data from a server, doing so in the background (e.g., "asynchronously") without interfering with the performance of the existing page. JSON is an open standard format using human-readable text, as an alternative to XML, to transmit data between a server and web application. Web applications such as AJAX and JSON communicate with a server in the background, without interfering with the current state of the webpage. JSON is used to pass AJAX updates between client and server.

In exemplary inventive practice, SQL (central) server data is exported to a JSON file format for exchange of data. The user logs into the tablet with a standard browser. The webpage is written so that, via AJAX calls, data is pulled from the SQL central server database to a web page. The data is then parsed and stored locally into a Web SQL database on a client side database browser. When storage of the data in the Web SQL database is completed, the data is no longer on the Internet. AJAX is used to retrieve JSON files, and the JSON files are parsed using jQuery. A JSON file that is retrieved by AJAX is parsed using jQuery, which is a JavaScript library used on the client side to simplify scripting of HTML. Parsing is a process involving analysis of a string of data that is in a JSON file.

As distinguished from the online network browser that is used to store and retrieve data from the central (SQL) database, an offline local browser is used to store and retrieve data from the local (Web SQL) database. The online database is on the server side; the offline database is on the client side. The local browser is local on the user's tablet, operating without a network. Once the user has synched (synchronized) the Web SQL data to his tablet, he is now mobile. The user can go throughout the ship with all of the relevant data, and can run his/her webpage as if he or she were wirelessly connected to the network. Exemplary inventive practice thus represents what may be described as an "alternative WIFI solution" for large groups of people in large areas such as ships. People can go about, with tablet in hand, keeping wirelessly informed in a sizable region in which WIFI or other wireless connection is undependable or problematical.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention.

What is claimed is:

1. A computer-implemented method for integrating information from different sources, the method comprising:
inputting data from plural informational groupings into an enterprise service bus, the inputting being performed in accordance with a selected subject wirelessly transmitted from a mobile computing device to the enterprise service bus, the mobile computing device having resident therein a local browser operating in the absence of a network, wherein the wireless transmission of the selected subject from the mobile computing device includes implementation of the local browser;
collating at least a portion of the data that is input into the enterprise service bus;
storing the collated data in a network database;

downloading, onto an online webpage, the collated data that is stored in the network database;

parsing the collated data that is downloaded onto the online webpage;

storing the parsed collated data in a local database;

synching, to the mobile computing device, the parsed collated data that is stored in the local database;

downloading, onto an offline webpage, the synched parsed collated data that is stored in the local database, the downloading onto an offline webpage including implementation of the local browser;

displaying the offline webpage on the mobile computing device, the displaying of the offline webpage including implementation of the local browser;

wirelessly transmitting, via the mobile computing device, the selected subject to the enterprise bus, the wireless transmission of the selected subject including implementation of the local browser;

wherein a user of the mobile computing device engages in mobile communication to select and access data from said plural informational groupings, the mobile communication including implementation of the local browser.

2. The method of claim 1 further comprising selecting the subject prior to the communicating of the selected subject to the enterprise service bus.

3. The method of claim 2 wherein the selecting of the subject and the communicating of the selected subject are performed at least twice.

4. The method of claim 1 wherein the data that is collated in the enterprise service bus and stored in the network database pertains to the selected subject.

5. The method of claim 1 wherein the informational groupings are maintenance informational groupings, and wherein the collating includes ordering and indexing plural maintenance items.

6. The method of claim 1 wherein said mobile computing device is a tablet.

7. An apparatus for integrating information from different sources, the apparatus comprising a server computer and a client computer;

said server computer having a server processor and server computer code characterized by server computer program logic, said server computer code being executable by said server processor and stored on a non-transitory computer readable server storage medium wherein, in accordance with said server computer program logic, said server computer performs acts including:

inputting data from plural informational groupings into an enterprise service bus;

collating at least a portion of said data that is input into said enterprise service bus;

storing said collated data in a network database;

receiving communication of at least one topic from said client computer;

said client computer having a client processor and client computer code characterized by client computer program logic, said client computer code being executable by said client processor and stored on a non-transitory computer readable client storage medium wherein, in accordance with said client computer program logic, said client computer performs acts including:

downloading, onto an online webpage, said collated data that is stored in said network database;

parsing said collated data that is downloaded onto said online webpage;

storing said parsed collated data in a local database;

synching said parsed collated data that is stored in said local database;

downloading, onto an offline webpage, said synched parsed collated data that is stored in said local database, said downloading onto an offline webpage including implementation of a local browser resident in said client computer, said local browser operating in the absence of a network;

displaying said offline webpage on said client computer, said displaying of said offline webpage including implementation of said local browser;

communicating said at least one topic to said enterprise bus, said communicating of said at least one topic including implementation of said local browser;

wherein said inputting of said data from said plural informational groupings into said enterprise service bus is performed in accordance with said at least one topic communicated by said client computer to said enterprise bus.

8. The apparatus of claim 7 wherein said informational groupings are maintenance informational groupings, and wherein said collating includes ordering and indexing plural maintenance items.

9. The apparatus of claim 7 wherein said informational groupings are maintenance informational groupings, and wherein said collating includes ordering and indexing plural maintenance items.

10. The apparatus of claim 7 wherein:

said communicating of said at least one topic and said inputting of the communicated said at least one topic are performed on at least two occasions;

on at least two said occasions that said communicating of said at least one topic and said inputting of the communicated said at least one topic are performed, said synched parsed collated data that is stored in said local database pertains to a different said at least one topic.

11. The apparatus of claim 10 wherein said informational groupings are maintenance informational groupings, and wherein said collating includes ordering and indexing plural maintenance items.

12. The apparatus of claim 7 wherein said client computer is a mobile computing device.

13. The apparatus of claim 12 wherein said mobile computing device is a tablet.

14. A computer program product for integrating information from different sources, the computer program product comprising a server non-transitory computer-readable storage medium and a client non-transitory computer-readable storage medium, said server non-transitory computer-readable storage medium having server computer-readable program code portions stored therein for execution by a server computer, said client non-transitory computer-readable storage medium having client computer-readable program code portions stored therein for execution by a client computer, wherein:

said server computer-readable program code portions include: a first said server computer-readable program code portion, for inputting data from plural informational groupings into an enterprise service bus; a second said server computer-readable program code portion, for collating at least a portion of said data that is input into said enterprise service bus; a third said server computer-readable program code portion, for storing said collated data in a network database; a fourth said server computer-readable program code portion, for receiving communication of at least one topic from said client computer;

said client computer-readable program code portions include: a first said client computer-readable program code portion, for downloading, onto an online webpage, said collated data that is stored in said network database; a second said client computer-readable program code portion, for parsing said collated data that is downloaded onto said online webpage; a third said client computer-readable program code portion, for storing said parsed collated data in a local database; a fourth said client computer-readable program code portion, for synching said parsed collated data that is stored in said local database; a fifth said client computer-readable program code portion, for implementation of a local browser for downloading, onto an offline webpage, said synched parsed collated data that is stored in said local database, said local browser resident in said client computer and operating in the absence of a network; a sixth said client computer-readable program code portion, for implementation of said local browser for displaying said offline webpage on a client computer; a seventh said client computer-readable program code portion, for implementation of said local browser for communicating said at least one specified topic to said enterprise bus;

wherein said inputting of said data from said plural informational groupings into said enterprise service bus is performed in accordance with said at least one specified topic communicated by said client computer to said enterprise bus, said communication by said client computer to said enterprise bus including implementation of said local browser.

15. The computer program product of claim 14 wherein said informational groupings are maintenance informational groupings, and wherein said collating includes ordering and indexing plural maintenance items.

16. The computer program product of claim 14 wherein said client computer is a mobile computing device.

17. The computer program product of claim 16 wherein said mobile computing device is a tablet.

18. The computer program product of claim 16 wherein said informational groupings are maintenance informational groupings, and wherein said collating includes ordering and indexing plural maintenance items.

* * * * *